United States Patent [19]
Laboue et al.

[11] 3,910,537
[45] Oct. 7, 1975

[54] DEVICE FOR SUPPORTING FLAT ELECTRICAL CABLES

[75] Inventors: Bernard André Laboue, Goussainville; René Qu'Hen, Gressy, both of France

[73] Assignee: Compagnie Honeywell Bull, Paris, France

[22] Filed: June 11, 1974

[21] Appl. No.: 478,409

[30] Foreign Application Priority Data
June 19, 1973 France .............................. 73.22309

[52] U.S. Cl. ............................... 248/68 CB; 211/41
[51] Int. Cl.² .......................................... F16L 3/22
[58] Field of Search ............ 248/68 R, 68 CB, 74 R, 248/74 A, 65, 73; 211/40, 41, 43, 120; 174/129 B, 171

[56] References Cited
UNITED STATES PATENTS

| | | | |
|---|---|---|---|
| 633,416 | 9/1899 | Beaulieu | 211/43 |
| 1,480,939 | 1/1924 | Hand | 211/41 |
| 1,876,584 | 9/1932 | Austin | 248/74 R X |
| 2,445,463 | 7/1948 | West | 248/68 R X |
| 3,203,745 | 8/1965 | Righter | 211/41 X |
| 3,294,349 | 12/1966 | Mathes | 248/68 R |
| 3,614,297 | 10/1971 | Carlson | 174/129 B X |
| 3,747,775 | 7/1973 | Merola | 211/43 |
| 3,807,675 | 4/1974 | Seckerson et al | 248/74 A X |

FOREIGN PATENTS OR APPLICATIONS

| | | | |
|---|---|---|---|
| 386,191 | 4/1965 | Switzerland | 248/74 R |
| 1,272,412 | 7/1968 | Germany | 248/74 A |
| 667,848 | 11/1938 | Germany | 248/68 |

*Primary Examiner*—Roy D. Frazier
*Assistant Examiner*—Rodney H. Bonck
*Attorney, Agent, or Firm*—David A. Frank; Ronald T. Reiling

[57] ABSTRACT

A plurality of parallel plates are detachably coupled to each other. Each of the plates has a substantially flat side and a second side which is opposite and parallel to said flat side. The second side is comprised of a flat face between an abutment and a projecting face; the latter two protrude with respect to the flat face. The plates interlock in the area of the projections. This configuration of plates forms an assembly for holding a plurality of electrical cables in the substantially rectangular, hollow spaces formed between adjacent plates.

5 Claims, 2 Drawing Figures

U.S. Patent  Oct. 7,1975  3,910,537

DEVICE FOR SUPPORTING FLAT ELECTRICAL CABLES

BACKGROUND

The present invention relates to a device for supporting flat electrical cables.

Flat electrical cables are known which are made up of a plurality of parallel co-planar conductors which are fixed in place in an insulating strip which isolates the conductors electrically and holds them together. Cables of this type are chiefly used in data-processing machines, and generally speaking, each machine needs a plurality of these cables. It is therefore essential that when the cables are attached to the machine, said cables are also held and supported in a manner appropriate to this usage.

Apparati are known in the prior art for holding and/or attaching cables. However, such apparati are generally inappropriate for the present purposes. Furthermore, those apparati which may be adopted for the present purpose are either complex in design and hence expensive to fabricate, or difficult to use and hence undesirable to use.

SUMMARY

In accordance with the invention, a device for supporting flat electrical cables is notable in that it comprises a plurality of parallel plates lying transverse to the cables. The plates are held together at one end, with pairs of consecutive plates forming a space between the pair for holding one such cable.

Thus, the device according to the invention is formed by a sort of deep comb between the teeth of which the cables are inserted.

Preferably, so that the number of plates can be matched to the number of cables in a bundle, the plates are held together in such a way as to be detachable. The plates are preferably secured to one another by a plugging or clipping engagement.

In an advantageous embodiment, each plate has a projection at one end of one face, this projection being provided with clipping and/or plugging means capable of co-operating with complementary clipping and/or plugging means which another plate has on the opposite face from the projection. The opposite face may be entirely flat or may itself have a projection. In the first case the space between the plates, i.e. the seating for the cables, is thus created by the thickness of the projection.

Preferably, to prevent the cables from being able to come out of their seating at the opposite end from the projections, the corresponding end of each plate has, on at least one face, an abutment which makes contact with the adjoining plate facing it. Where the plates have projections on only one face they each incorporate a single abutment of the same thickness as the projection. Thus the abutment and the projection on a plate bear against the two ends of the entirely flat face of the plate facing them.

The plates may be made from a relatively flexible material and may for example be moulded from a relatively stiff plastics material. In this case, it is advantageous for the surface of the abutment which faces towards the adjacent plate against which it rests to be chamfered so as to form an outward opening V-shaped groove and thus make it easier for a cable to be inserted between the abutment and the adjacent plate by separating the appropriate ends of adjoining plates elastically to a limited extent.

At either end of the plate assembly may be provided a terminal angle-bracket, these being arranged like book-ends and being used to secure the assembly in place on a framework or a rigid support. Preferably the anglebrackets are joined to the plates at the ends of the assembly by a fixing arrangement similar to that used to connect two adjoining plates. Furthermore, matching openings may be provided in the angle-brackets and in the projections on the plates so that a fixing bolt may be passed through them.

The device according to the invention may be used with the plates in any orientation whatever. They may for example be vertical or horizontal. In the latter case, particularly if the cables are heavy, it is possible that the opposite ends of the plates from the projections might spread apart in an undesirable way and might possibly allow the cables to come free. To overcome this drawback it is advantageous to provide a clip which clips elastically into the ends of the anglebracket remote from the support and which holds the abutment on each plate pressed against the plate facing it.

BRIEF DESCRIPTION OF THE DRAWINGS

The Figures in the accompanying drawings will give a better understanding as to how the invention may be put into effect.

DESCRIPTION OF THE PREFERRED EMBODIMENT

Figure 1:
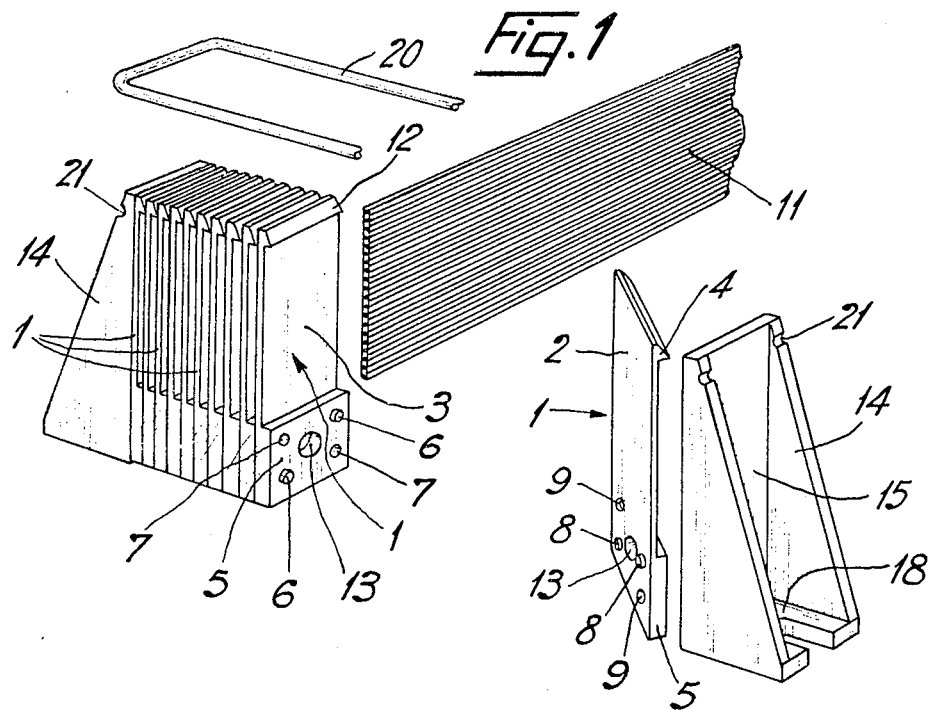
FIG. 1 shows a partly exploded perspective view of the device according to the invention.
Figure 2:
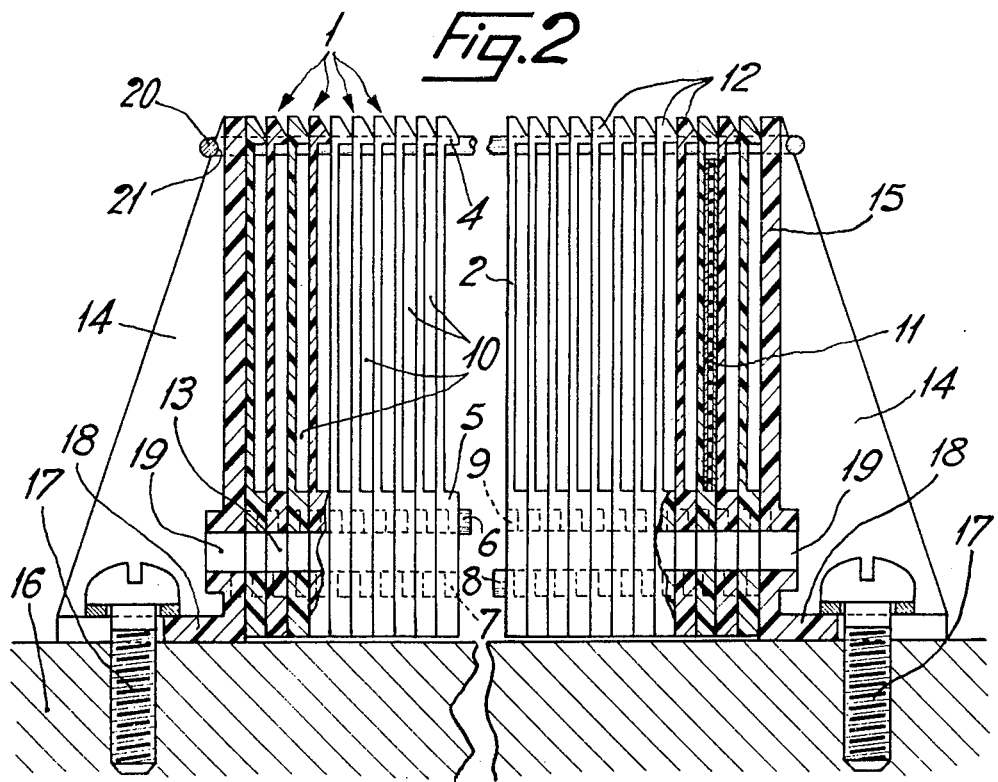
FIG. 2 is a longitudinal cross-section through the device according to the invention.

The embodiment of the device according to the invention, which is shown in these Figures, is formed by a plurality of identical, contiguous flexible plates 1, which may be made of a relatively stiff synthetic material. Each plate has an entirely flat face 2 and a partially flat face 3 from which projects an abutment 4 at one end and a plane projection 5 at the other end. The thickness of abutments 4 is the same as that of projections 5.

Studs 6 and holes 7 are formed on or in the exposed faces of projections 5. Similarly, studs 8 and holes 9 are made on or in faces 2 of plates 1 at the level at which projections 5 are situated. The size and arrangement of studs 6 and 8 and holes 7 and 9 are such that two plates may be joined together by inserting the studs 6 on a first plate into the holes 9 in a second plate, and by inserting the studs 8 on the second plate into the holes 7 in the first plate. In this way, an assembly may be comprised of a plurality of plates 1 in which the side of the plate containing abutments 4 and the projections 5 on one plate rest against the face 2 of an adjoining plate. Since abutment 4 and projection 5 are in relief from face 3 of the plates 1, it results in an assembly in which spaces 10 are formed between pairs of consecutive plates 1. These spaces 10 may thus be used to hold flat cables 11, which lie transversely to the plates 1. To make it easier to insert a cable 11 between two adjoining plates 1, it is advantageous for the abutments 4 to have an outwardly directed chamfer 12. The plates 1 may contain an opening 13 which passes entirely through them at the level at which projections 5 are situated.

The device according to the invention further includes terminal angle-brackets 14 each of which has a limb 15 parallel to the faces of the plates, which limbs are joined to the plates 1 facing them by means of studs 6 and 8 and holes 7 and 9. The angle-brackets are similar to book-ends and may be secured to a support 16 by means of screws 17, which pass through a limb 18 which is perpendicular to plates 1. In this way the device according to the invention may be secured to the support 16.

Limbs 15 of the angle-bracket 14 have through them openings 19 which coincide with openings 13. Thus, a threaded rod (not shown) may pass through the assembly formed by plates 1 and limbs 15, so that they can be held even more solidly together by means of a nut engaged on the rod.

A circlip 20, which confines the ends of the plates 1 adjacent to abutments 4 and which clips into the notches 21 provided for this purpose on the angle-brackets 14, prevents the strips 1 from moving apart from one another, particularly if the support 16 and the plates 1 should be distorted under the weight of cables 11.

What is claimed is:

1. A device for supporting a plurality of flat electrical cables comprising:
    a plurality of holding members, each of said members including:
    a first substantially rectangular side which is flat and provided with at least one pair of coupling means,
    a second substantially rectangular side parallel to said first side, said second side having
    a projection at a first end, said projection provided with at least one pair of coupling means,
    an abutment at a second end opposite said first end, said abutment of the same thickness as said projection and coming into contact with an adjacent member, and
    a flat face between said first and said second ends;
    each of said pairs of coupling means including a male member and a female member for interlocking with another pair of coupling means provided on an opposite side of an adjacent member; and
    a pair of terminal angle brackets for attaching said device to a support, each of said brackets including:
    a first section with an opening for passing a bolt therethrough, for attaching said bracket to said support,
    a second section substantially perpendicular to said first section, said second section having a flat face with at least a pair of coupling means for interlocking with another pair of said coupling means on one of said holding members; and
    said members and said pair of brackets combining to form an assembly of parallel members for holding one of said cables within each of the substantially rectangular hollow passageways formed between pairs of adjacent members and between pairs of said members and said brackets.

2. A device according to claim 1 wherein the said members are flexible.

3. A device according to claim 1, wherein the surface of the abutment facing the adjoining member has a chamfer to form a V-shaped groove which opens outwards.

4. The device according to claim 1 wherein
    said holding members are provided with aligned openings passing transversely from said first side to said second side in the area corresponding to said first end of said second side;
    said terminal brackets are also provided with openings aligned with said openings in said holding members; and
    a fixing bolt passing through said aligned openings for further detachably holding together said plurality of holding members and terminal brackets.

5. A device according to claim 4 wherein said second section further includes notches aligned with said abutments, and
    an elastic band for further holding said members and said brackets together, said band held in place by said notches.

* * * * *